United States Patent [19]

Blomstrom

[11] 4,061,393
[45] Dec. 6, 1977

[54] SHOCK MOUNTED TILTING OPERATOR PLATFORM

[75] Inventor: Gary D. Blomstrom, Waverly, Nebr.

[73] Assignee: Caterpillar Tractor Co., Peoria, Ill.

[21] Appl. No.: 640,514

[22] Filed: Dec. 15, 1975

[51] Int. Cl.² ........................................... B62D 27/04
[52] U.S. Cl. ............................... 296/28 C; 24/221 K;
    180/89.12; 180/89.14; 180/89.17; 296/35 R
[58] Field of Search ................ 296/28 C, 35 R, 35 A,
    296/102; 24/221 K; 180/89.13, 89.14, 89.15,
    89.16, 89.18

[56] References Cited

U.S. PATENT DOCUMENTS

| 2,900,697 | 8/1959 | Cuss | 24/221 K |
|---|---|---|---|
| 3,088,537 | 5/1963 | Tourneau | 180/89 A |
| 3,203,728 | 8/1965 | Wood | 296/102 |
| 3,497,257 | 2/1970 | Hirst | 180/89 A |
| 3,578,377 | 5/1971 | Babbitt | 296/102 |
| 3,612,581 | 10/1971 | Frankenberg | 296/102 X |
| 3,667,566 | 6/1972 | Hopkins | 180/89 A |
| 3,706,470 | 12/1972 | Johnson | 180/89 A X |
| 3,717,372 | 2/1973 | Carr | 296/35 A |
| 3,825,295 | 7/1974 | Saunders | 180/89 A X |
| 3,847,492 | 11/1974 | Kennicutt | 296/28 C X |
| 3,924,544 | 12/1975 | Grau | 296/35 A X |

FOREIGN PATENT DOCUMENTS

| 1,439,918 | 4/1966 | France | 180/89 A |
|---|---|---|---|
| 1,289,992 | 9/1972 | United Kingdom | 180/89 A |

Primary Examiner—Joseph F. Peters, Jr.
Assistant Examiner—John P. Silverstrim
Attorney, Agent, or Firm—Wegner, Stellman, McCord, Wiles & Wood

[57] ABSTRACT

A mounting assembly resiliently and releasably mounting a tiltable operator's cab on the frame of a tractor including first and second mating connectors respectively secured to the platform and frame and a T-shaped latch carried by the first connector for rotary movement between locked and unlocked positions. A cross member of the T-shaped latch overlies the mating end of the first connector and is movable into locking, but nonsupportive, engagement within a pair of complementary slots respectively located in a pair of upwardly projecting arms of the second connector. In the unlocked position, the cross member is disengaged from the slots and aligned within a latch cavity between the arms to allow separation of the connectors. An elongate stem of the latch member accessibly protrudes from one end of the first connector for rotation by a wrench and is resiliently mounted for axial movement to align the cross member with the complementary slots. A female guide surface defined by beveled ends of the second connector arms guides a male guide surface of the first connector into full mating load-bearing engagement therewith in the event of slight misalignment between the connectors. The second connector is resiliently secured to the frame to isolate the cab from vibrations generated within the frame by means spaced from the bearing surfaces and the latch.

1 Claim, 7 Drawing Figures

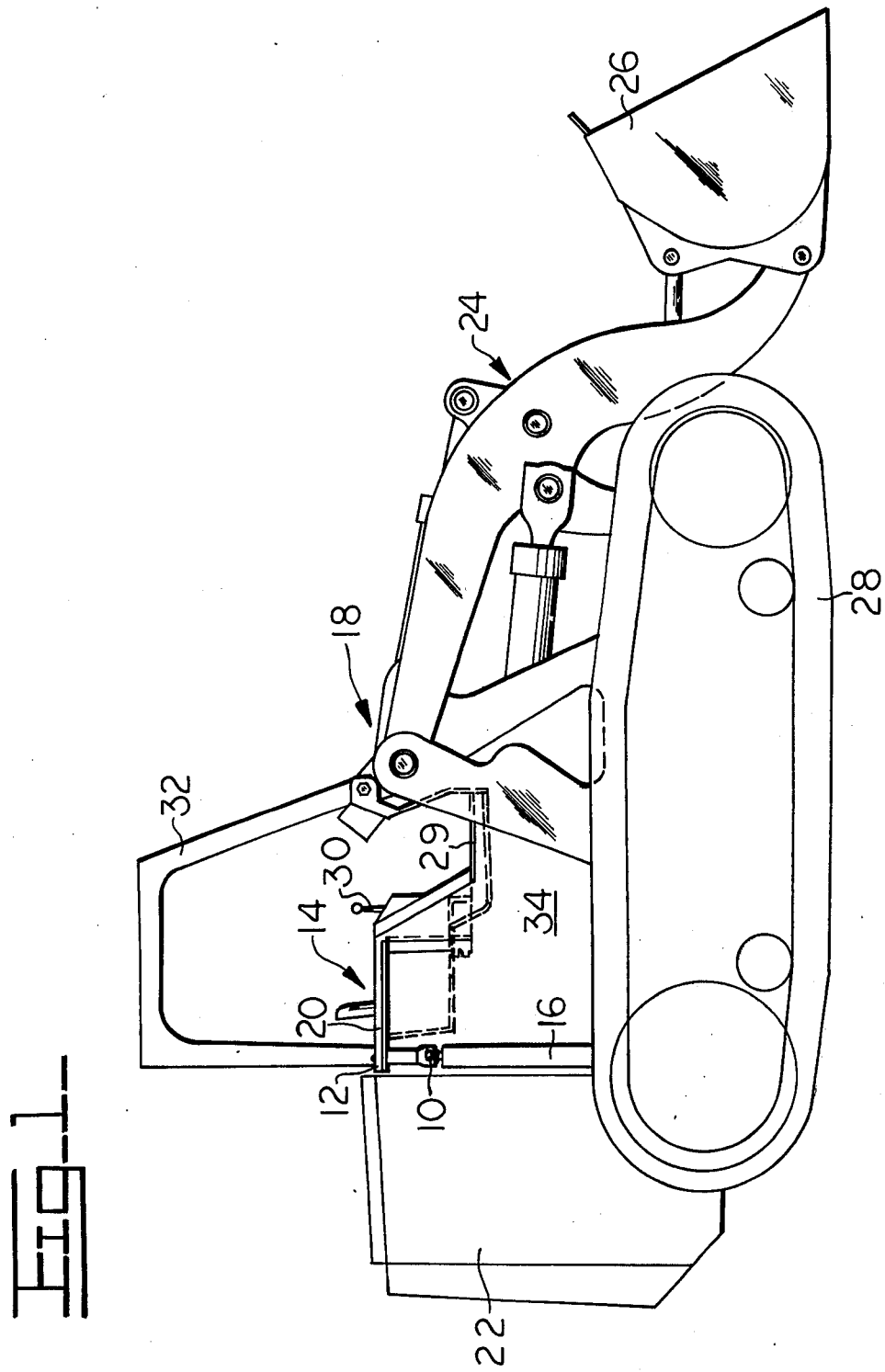

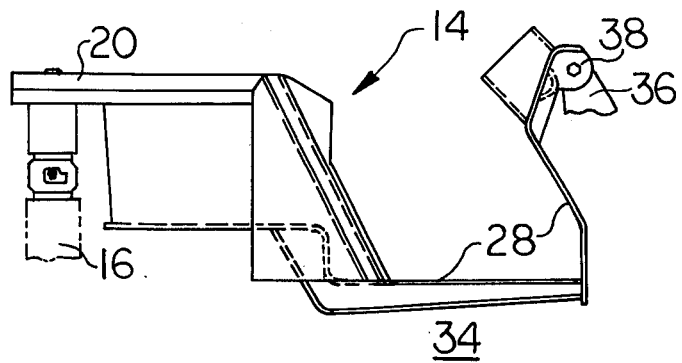
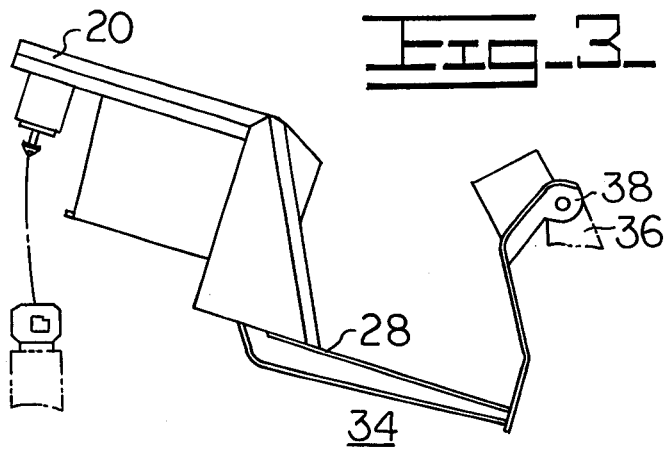
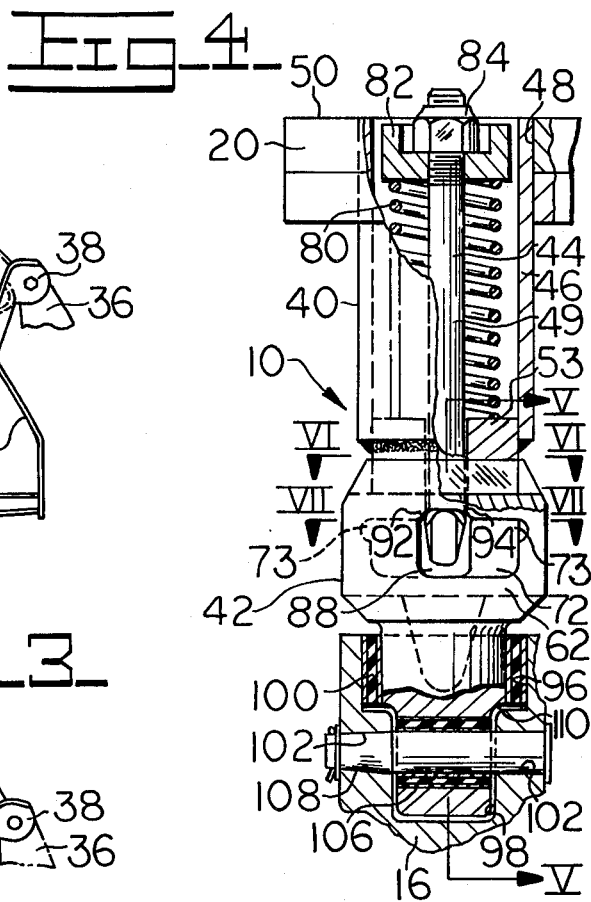

SHOCK MOUNTED TILTING OPERATOR PLATFORM

BACKGROUND OF THE INVENTION

This invention relates to an assembly for resiliently and releasably mounting the free end of a tiltable operator's platform to the frame of an earthmoving vehicle or the like.

Operator's cabs of earthmoving vehicles are often pivotally mounted to the frame of the vehicle to facilitate raising the cab from a substantially horizontal operating position in which it overlies vehicle components to a tilted maintenance position in which the vehicle components are exposed for maintenance work and repair. Tiltable cabs are typically secured at one end thereof to the frame by pivot means. The operator's cab is supported adjacent the other end thereof by releasable connectors.

The releasable connectors are conventionally provided with some means to hold the cab to the frame to prevent separation of the cab from the frame at the free end thereof when the vehicle is being operated and tilting is to be prevented. On the other hand, it is desirable to provide means to facilitate quick and easy release of the free end of the cab from the frame when tilting is desired and quick and secure mounting in the operating position when repairs are completed. It is also important that the cab be resiliently mounted to the frame both at the pivotal mounts and the releasable mounts to isolate the cab from vibrations generated in the frame during vehicle operation.

Various types of mounting apparatus are known which achieve some, but not all, of the desired mounting characteristics noted above. A resilient mount is shown in U.S. Pat. No. 3,847,492 of Kennicutt et al issued Nov. 12, 1974, to Caterpillar Tractor Co., the assignee of the present invention, in which a first connector attached to the cab is resiliently supported on a resilient bushing surrounding a bolt extending through a second connector attached to the frame. In U.S. Pat. No. 3,578,377 of Babbitt, Jr., et al, issued May 11, 1971, to the assignee of the present invention, a pivotally mounted frame with a releasable mount at the free end of the cab is shown, but no means is provided for isolating the cab from frame vibrations. In U.S. Pat. No. 3,203,728 of Wood issued Aug. 31, 1965, to Concrete-Steel Corporation, the end of a first connector is resiliently supported within a resilient boot combined between a pair of rigid semicylindrical connector sections attached to the frame, and a bolt extending through the cylindrical sections and the first connector prevents separation thereof. The bolt is apparently readily removable, but relative movement between the rigid end of the first connector and the resilient boot, detrimental to the resilient boot material, is permitted. Further, accurate vertical alignment between the cylindrical section and the first connector is needed for mating engagement and insertion of the bolt. Moreover, the bolt is completely removed from both connectors to allow separation and, when removed, may be misplaced or lost.

A different type of mount is shown in U.S. Pat. 3,667,566 issued June 6, 1972, to Hopkins, which is readily releasable, and in which the latch member is carried by one of the connectors. However, the latch member securing the two connectors together apparently supports the weight of the cab, and a complicated hydraulic-powered cylinder and piston assembly is thereby needed for disconnection. Further, no means are provided for isolating the cab from frame vibrations.

SUMMARY OF THE INVENTION

The principal object of the present invention is to provide an assembly for releasably mounting the free end of a tiltable operator's cab to a vehicle frame of simple and inexpensive construction which is both effective to quickly and easily mount the cab and lock it against tilting during operation and actuatable to readily release the cab from the frame to permit tilting for maintenance work and repairs. A further objective is to provide such a mounting assembly with means to resiliently isolate the cab from frame vibrations.

An important feature of the releasable mounting assembly directed to achieving the first of these objectives is a latch member mounted on one of a pair of connectors respectively attached to the cab and the frame for movement between a locked position in which it is in nonsupportive latching engagement with the other one of the pair of connectors to prevent separation thereof and an unlocked position in which restraint against separation is released. The latch member does not support the weight of the cab and is thereby readily movable between its locked and unlocked positions. Further, because the latch member is carried by one of the connectors, it cannot be misplaced or lost as the latch members of the prior art discussed above.

Another advantageous feature is that the complementary male and female mating guide surfaces of the two connectors are tapered such that upon initial engagement, camming action occurs to align them for full mating engagement. Further, the one connector not carrying the latch member is provided with the female mating guide surface to guide the latch member into alignment with a latching surface located therebeneath as the cab is moved into its operating position. The necessity for perfect alignment between the two connectors is thereby avoided and quick and easy connection facilitated.

A further feature of the releasable mounting assembly is that a stem portion of the latch member extends through the connector secured to the cab and is thereby readily accessible from the top surface of the cab for the application of rotary force to move the latch between its locked and unlocked positions.

Yet another feature is that the cab is isolated from frame vibrations by means resiliently mounting one of the connectors to the cab or frame to which it is secured rather than resiliently mounting one connector to the other as in the prior art. The relative position of the two connectors when in locked supportive engagement with one another is unaltered by differences in cab weight and changes in the compressibility characteristics of the resilient mounting. Alignment of the latch member carried by one connector with a mating latching surface of the other connector is thereby unaltered by such factors. Further, abrasive nonresilient relative movement between rigid connector surfaces and resilient material surfaces is not permitted.

The advantages of the foregoing features will be made more apparent, and further advantageous features will be disclosed in the description of the preferred embodiment.

BRIEF DESCRIPTION OF THE DRAWING

The following description of the preferred embodiment will be given with reference to the several views of the drawing, in which:

FIG. 1 is a side elevational view of a rear engine loader with an operator's cab employing the releasable mounting assembly;

FIG. 2 is an enlarged side elevational view of a portion of the operator's cab illustrating the releasable mounting assembly in more detail with the operator's cab in the operating position;

FIG. 3 is a side elevational view similar to that of FIG. 2, but with the operator's cab in a tilted position;

FIG. 4 is a greatly enlarged side view, partially in section, of the releasable mounting apparatus shown in the previous views;

FIG. 5 is a side sectional view taken along line V—V of FIG. 4 illustrating the latch member in its locked position;

FIG. 6 is a horizontal section taken along line VI—VI of FIG. 4 with the latch member in its locked position shown in solid lines and with the latch member in its unlocked position shown in broken line; and FIG. 7 is another horizontal section of the releasable mounting assembly taken along line VII—VII of FIG. 4.

DESCRIPTION OF THE PREFERRED EMBODIMENT

Referring to FIG. 1, an embodiment of one of a pair of identical releasable mounting assemblies or releasable mounts 10 of the present invention is seen as employed to mount the free end 12 of an operator's cab 14 to the end of one of a pair of symmetrically disposed frame elements or pedestals 16 of a rear engine loader 18. The releasable mounts 10 are respectively located adjacent the right rear and left rear corners of a horizontal plate or cab element 20 of operator's cab 14.

The loader 18 also includes a power unit 22 and a bucket linkage 24 carrying a bucket 26. The entire frame is supported on an undercarriage and driven by a pair of endless track chains 28. The cab 14 includes an operator's platform 29 adjacent a control 30 which is secured to and supported by cab element 20. Supported by platform 29, in turn, is a roll-over protection structure 32. Located beneath platform 29 in the area indicated by reference numeral 34 are a large number of hydraulic elements, circuitry, and other vehicle components (not shown). Accessibility to area 34 is necessary for maintenance and repair of the vehicle components thereat. Accordingly, as best seen in FIGS. 2 and 3, the operator's platform 29 is pivotally secured at a forward end thereof to a pair of legs 36 of the loader frame by means of a pair of pivot means 38 (only one shown).

It is possible that during operation of the loader 18, forces may be applied to cab 14 tending to pivot it toward a tilted position as shown in FIG. 3. Such forces would result, for instance, if the cab were stopped abruptly while traveling forwardly down an incline. Accordingly, releasable mount 10 includes a latch mechanism selectively operable to prevent separation of cab elements from pedestals 16.

Turning now to FIGS. 4 and 5, the structural details of the releasable mount 10 can be seen. Included is a first connector 40 fixedly secured to cab element 20, a second connector 42 fixedly secured to pedestal 16, and a latch member 44 carried by first connector 40. The latch member 44 is mounted on connector 40 for movement between locked and unlocked positions, as will be seen.

The first connector 40 has an elongate, rigid, tubular body 46 which extends through a hole 48 in cab element 20 and is secured thereto by a weld joint or the like. The upper end of body 46 is open and stem 49 of latch member 44 protrudes therethrough and is thus accessible from the top surface 50 of cab element 20.

The body 46 extends toward second connector 42 for mating, load-bearing engagement therewith. Load-bearing surfaces for the first connector 40 are provided by a seat 52 secured to the free end of body 46. The seat 52 has a collar 53 of rectangular cross section nestled between the side walls of body 46 in a pair of aligned slots therein, as best seen in FIG. 4, and extends outwardly beyond the side walls in its elongate direction, as seen in FIG. 5. A wedge-shaped male protection 55 extending downwardly from the central section of collar 53 provides a pair of beveled guide surfaces 56. Guide surfaces 56 are symmetrically tapered downwardly and inwardly toward one another and terminate at opposite sides of a substantially horizontal leading edge surface 57 parallel to collar 53. A substantially horizontal loadbearing surface is provided by a pair of shoulders 54 defined by the underside surfaces of collar 53 between the opposite ends thereof and projection 55.

Load-bearing surfaces 66 adapted to mate with the load-bearing surfaces 54 of the first connector 40 are located at ends of a pair of identical spaced arms 62 projecting upwardly from a solid body 64 of connector 42. Arms 62 are symmetrically disposed on opposite sides of connector 42 and spaced from one another in a direction parallel to the taper of load-bearing surfaces 56. Each arm 62 also has a downwardly and inwardly inclined beveled surface 68. The two beveled surfaces 68 define a recessed or female guide surface for mating receipt of the male guide surfaces 56.

The above-described shapes and arrangement of the various bearing surfaces are directed to facilitate quick and easy connection of the first and second connectors into full mating bearing engagement. If the first connector 40 is slightly misaligned with second connector 42 in a direction parallel to the pivot axis of the cab 14, leading edge surface 57, upon engaging either one of beveled guide surfaces 68, is guided thereby to align the connectors. The bifurcation of the guide surfaces 68 in a direction normal to the pivot axis of the cab 14 permits minor misalignment in that direction.

The shapes and arragement of the various mating load-bearing surfaces also function to restrain the first and second connectors against relative movement once they are in full mating bearing engagement. Load-bearing surfaces 66 underlying shoulders 54 provide the principal support for the weight of the cab 14, and prevent male projection 55 from wedging arms 62 apart and over-traveling into a latch cavity beneath beveled surfaces 68.

Connectors 40 and 42 are restrained against separation by cooperation of latch member 44 with a pair of slots 72 extending through respective ones of the pair of arms 62 to communicate with a latch cavity 74, FIG. 5, therebetween. Latch member 44 is T-shaped, having an elongated cross member 76 carried at one end of an elongate stem 78. The stem 78 extends upwardly through an opening 77 in seat 52 and through the hollow body 46 of the first connector 40.

The stem 78 is resiliently held within body 46 by means including a coil spring 80. A retainer 82 overlies spring 80 and receives therethrough a threaded end of stem 78, and a nut 84 is attached to the threaded end of stem 78 and overlies retainer 82. The bottom of spring 80 rests upon the top surface of collar 53 as best seen in FIG. 2. The stem may be turned within the respective openings in the retainer 82 and the seat 52, and the resiliency of the spring 80 permits axial movement.

Latch member 44 is in its unlocked position when cross member 76 is substantially parallel to the elongate direction of beveled surfaces 68 and disposed between arms 62 within latch cavity 74, as seen in FIGS. 5 and 6. When in the unlocked position, the cross member 76 is resiliently biased against leading edge surface 57 to maintain it in proper alignment with arms 62. With the first and second connectors 40 and 42 in mating engagement with one another, the latch member is moved into its locked position by pressing downwardly on nut 84 to align cross member 76 with slots 72 and rotating it in a clockwise direction, as indicated by arrow 86, FIG. 7, so that the opposite ends of cross member 76 respectively extend through the pair of latching slots 72. Frictional drag between the mating threads of nut 84 and stem 78 results in the application of sufficient rotary force to stem 78 to cause it to turn.

Slots 72 have offset portions 73 extending in opposite directions from central portions 88 directly opposite one another. The cross member 76 is mounted through the offset portions 73 to reach the locked position in which it underlies a top edge 92 of each central portion 88. A side edge 90 of each slot engages the side of cross member 76 to terminate further movement of the cross member after substantially 90° of movement from the unlocked position. This restraint against further movement provides an indication that the latch member 44 is in its fully located position and prevents inadvertent overtravel of the latch 44 back to the unlocked position.

The top edge 92 of each central portion 88 extends above the top edge of the offset portion 73 to form an upturned shoulder 94. The spring 80 urges the top surface of cross member 76 into resilient engagement with edge 92, and shoulder 94 provides frictional and bearing restraint against counterclockwise rotation of cross member 76. This restraint, in conjunction with a snug fit of stem 78 in the central axis hole through seat 52 functions to also restrain the first and second connectors 40 and 42 against relative movement therebetween in a direction normal to the pivot axis of the cab 14.

In keeping with another aspect of the present invention, the releasable mounts 10 resiliently mount the cab 14 to the vehicle frame by means unassociated with the load-bearing surfaces of the connectors and the latch member 44. The resilient mounting need not be disassembled to separate the connectors, and vertical latching alignment is unaltered by a change in load or the compressibility characteristics of the resilient material employed by the mount.

As best seen in FIGS. 4 and 5, body 64 is resiliently supported within a pair of recesses 96 and 98 in the end of pedestal 16 by means of a pair of bushings 100 and 106. Body 64 has an upper cylindrical section 65 and a narrower section 67 therebeneath of rectangular cross section. Section 65 is supported within recess 96 by bushing 100, and section 67 is supported within recess 98 by bushing 106. Bushing 106 is fitted within a hole 104 in the end of section 67. A pin 108 extending through a pair of aligned holes 102 in opposite side walls of recess 98 and through bushing 106 supports a section 65 within recess 98 and secures the second connector 42 to pedestal 16. A shoulder between sections 65 and 67 is supported above the bottom surfaces of recess 96 so that resilient bushing 106 provides isolation against vibrations in the vertical direction. Bushing 100, on the other hand, provides lateral support and isolates the second connector 42 against vibration in the horizontal direction. Pin 108 is readily removable to allow withdrawal of body 64 from recesses 96 and 98 to facilitate replacement of bushings 100 and 106 as needed.

I claim:

1. An assembly for mounting an operator's cab to the frame of a vehicle, comprising:
 a first connector having a rigid load bearing surface at a free end thereof;
 a second connector having a rigid load bearing surface for mating supportive load bearing engagement with the bearing surface of the first connector;
 means for releasably locking together the first and second connectors when in supportive load bearing engagement with one another;
 means for securing the first connector to one of the cab and the frame, and
 means spaced from the rigid load bearing surfaces and the locking means for resiliently mounting the second connector to the other of the cab and the frame, said resilient mounting means isolating the cab from frame vibrations;
 said second connector having an elogate body with the load bearing surface at one of a pair of opposite end portions thereof, and
 said resilient mounting means including
  a resilient bushing within a bore extending through the body adjacent the other end portion thereof, and
  a pin supported by the frame and extending through the bushing, said frame having a recess therein for receipt of the other end portion of the body and said pin extending across the recess between opposite sides thereof;
 said frame having a hole overlying and communicating with the recess defining a shoulder therebetween,
 said body having a section above the other end portion defining a shoulder therebetween and received within the hole when the other end portion is within the recess, and
 said resilient mounting means including a bushing within the hole surrounding said section and resiliently isolating it from frame vibrations in a plane parallel to the pin, said pin supporting the shoulders in spaced relation.

* * * * *